Oct. 23, 1923.
M. AXILROD
1,471,717
FRICTION DRIVE CONTROLLING MECHANISM
Original Filed April 21, 1920
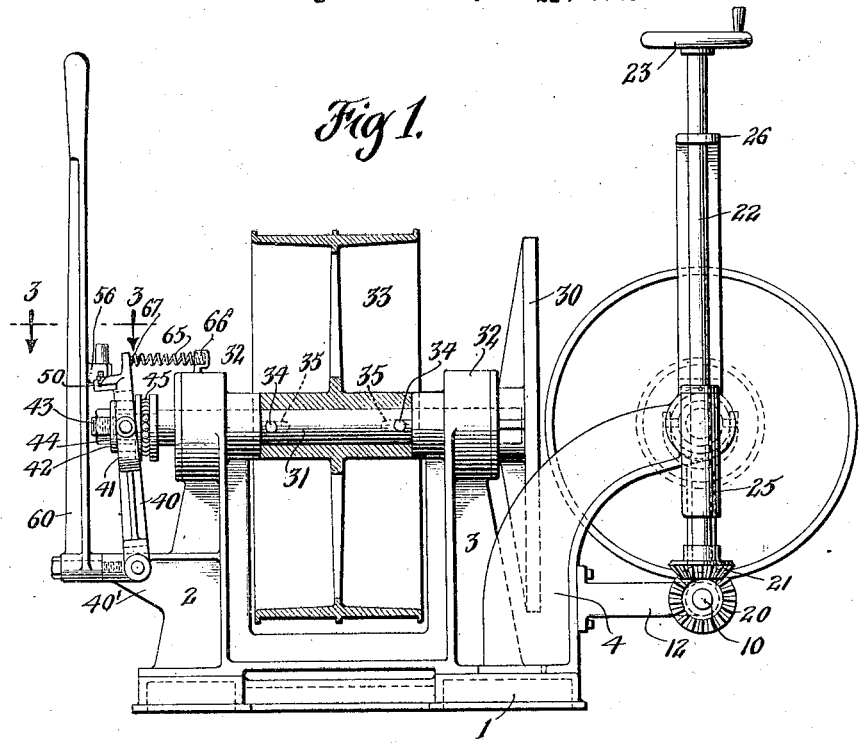
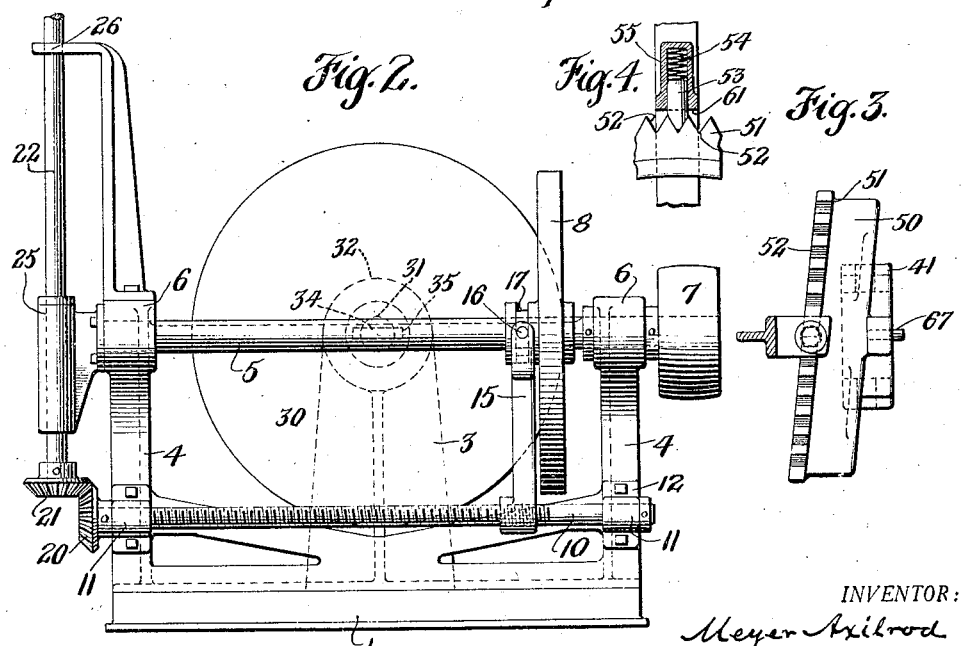
WITNESS.
Gustav Genzlinger.
INVENTOR:
Meyer Axilrod
BY Cyrus N. Anderson
ATTORNEYS.

Patented Oct. 23, 1923.

1,471,717

UNITED STATES PATENT OFFICE.

MEYER AXILROD, OF PHILADELPHIA, PENNSYLVANIA, ASSIGNOR TO AXILROD POWER TRANSMISSION COMPANY, OF PHILADELPHIA, PENNSYLVANIA, A CORPORATION OF DELAWARE.

FRICTION-DRIVE-CONTROLLING MECHANISM.

Application filed April 21, 1920, Serial So. 375,493. Renewed March 20, 1923.

*To all whom it may concern:*

Be it known that I, MEYER AXILROD, a citizen of the United States, and a resident of Philadelphia, in the county of Philadelphia and State of Pennsylvania, have invented an Improvement in Friction-Drive-Controlling Mechanism, of which the following is a specification.

My invention relates to mechanism for controlling and regulating friction drive mechanism and has for one of its objects to simplify and render more efficient such mechanism.

It has for a further object to provide improved means, comprising a lever actuated cam, for effecting shifting movement of one member of a friction drive couple for engaging and disengaging the coacting members of said couple.

Other objects and advantages of my invention will be pointed out in the detailed description thereof which follows or will be apparent therefrom.

For the purpose of rendering my invention more easily understood and in order that its practical advantages may be more fully appreciated, I have provided the accompanying drawing to which reference may be had and in which,—

Fig. 1 is a view partly in end elevation and partly in transverse section;

Fig. 2 is a view in side elevation, looking toward the left in Fig. 1;

Fig. 3 is a sectional view taken on the line 3—3 of Fig. 1 showing in plan a detail of the construction; and Fig. 4 is a sectional view taken at right angles to that shown in Fig. 3, and showing a detail of that construction.

Referring to the drawing: 1 designates the base of the machine provided with supporting posts 2, 3 and 4. A driving shaft 5 is provided which is revolubly supported in bearings 6 upon the upper ends of the supporting posts 4. The said shaft 5 is provided with a band wheel 7 by means of which it is driven from a source of power, not shown. Although the shaft 5 is driven it is referred to as a "driving shaft" because other parts of the mechanism are driven therefrom as will be pointed out later on herein. A friction drive wheel or disk 8 is mounted on the shaft 5 to revolve therewith and to slide longitudinally thereon. In order to effect such movements of the said wheel or disk the hub thereof has splined connection with said shaft 5 as shown. To effect shifting or sliding movement of the wheel or disk 8 upon its supporting shaft 5, I have provided a longitudinal stationary shifting screw rod 10 supported at its opposite ends in bearings 11 upon the outer ends of arms 12, which project horizontally from the lower portions of the supporting posts 4. The screw rod 10 is provided with a shifting arm or bar 15 bifurcated at its upper end, the bifurcations being provided with inwardly projecting pins 16 (only one being shown) which project into an annular groove 17 in an extension of the hub of the wheel or disk 8. The said screw rod is provided at one end with a bevel gear 20 with which is engaged a bevel gear 21 secured to the lower end of a vertical shaft 22 which is manually operable in either direction; that is, is rotatable manually in either direction by means of hand wheel 23 to effect rotation of the screw rod 10 in either direction to, in turn, effect movement of the wheel or disk 8 in either direction longitudinally of the shaft 5. The shaft 22 is supported in bearings 25 and 26 in brackets upon one of the supporting posts 4.

A friction plate 30, adapted to co-operate or co-act with the friction wheel or friction disk 8, is supported upon the inner end of a shaft 31, which is in turn revolubly and slidably supported in bearings 32 upon the upper ends of the supporting posts 2 and 3. A pulley 33 is supported upon said shaft 31, intermediate the bearings 32, and is connected to rotate therewith by pins 34 projecting in opposite directions from said shaft into slots 35 upon opposite sides of the hub of said wheel. These slots are of a length to permit longitudinal movements of the shaft 31 the requisite distances to effect engagement and disengagement of the face of the friction plate 30 with and from the edge of the friction wheel or disk 8. The pins 34 are at all times in engagement with the said slots 35.

In order to effect longitudinal movement back and forth of the shaft 31, I have provided an arm 40, pivoted at its lower end to a projection 40' extending outwardly from the supporting post 2, and having an enlarged circular portion 41 near its upper end having an opening therethrough, as indicated. In this opening there is swiveled or journaled a thrust block 42 retained in place upon the reduced end portion 43 of the shaft 31 by a nut 44. 45 designates a thrust bearing interposed between the block 42 and a shoulder upon the shaft 31, as shown.

The arm 40 is provided at its upper end with a cross head or T-head portion 50 which extends transversely of and at an obtuse angle with respect to the axis of the shaft 31. The said cross head or T-head portion is provided at its outer edge portion with an upwardly extending flange portion 51 which is provided with notches 52 with which a plunger 53 is held in engagement by a spring 54. The plunger and spring are mounted in a socket or seat 55 in a lug or projection 56 which projects laterally from a lever 60 pivoted at its lower end to the projection 40'. The lower end of the socket 55 opens into a notch 61 in the lower side of the projection 56 into which notch the flange 51 extends. The outer side of said notch engages with the outer surface of the flange 51 while the inner side thereof engages with the inner surface of said flange. These surfaces constitute cams. The lever 60 is mounted to swing in a vertical plane at right angles to the axis of the shaft 31. It will be apparent that when said lever is moved back and forth about its pivot with the notch 61 in engagement with the flange 51, the arm 40 will be swung back and forth upon its pivot to cause sliding in and out movement of the shaft 31. This is due to the inclined relation of the cross head or bar 50 and of the flange 51 to the axis of the shaft 31. As the lever 60 is moved back and forth the plunger 53 slides from notch to notch 52.

In order to assist in forcing and holding the arm 40 outwardly, I have provided an expansile spring 65 one end of which is seated in a socket in a bracket 66 upon the bearing 32 while the other bears against the extreme upper end portion of the arm 40, being held in place by a projection 67 extending inwardly therefrom.

I claim:

1. In a machine of the character described, the combination of a longitudinally movable shaft, an arm pivotally supported and extending transversely of said shaft and having operative connection therewith, said arm being adapted to be moved back and forth about its pivot in the direction of the length of said shaft, a member adapted to be moved back and forth transversely of said shaft, and means intermediate said arm and said member whereby the back and forth movements of said member cause back and forth movements of said arm to cause longitudinal movements of said shaft.

2. In a machine of the character described, the combination of a longitudinally movable shaft, an arm pivotally supported and extending transversely of said shaft and having operative connection therewith, a pivot for said arm, the said pivot being situated a distance from said shaft and extending substantially at right angles with respect thereto, a pivotally supported lever, a pivot for said lever, the said pivot being situated a distance from and in substantially parallel relation to the said shaft, and means for operatively connecting an intermediate portion of the said lever to the said arm whereby rocking movements of the said lever about its pivot effect rocking movements of the said arm about its pivot whereby longitudinal movement of the said shaft is effected.

3. In a machine of the character described, the combination of a longitudinally movable shaft, an arm pivotally supported and extending transversely of said shaft and having operative connection therewith, said arm having a part provided with parallel cam surfaces on opposite sides thereof, said surfaces extending transversely of and at obtuse angles with respect to the axis of said shaft, and movable means in engagement with said surfaces to effect movements of said arm about its pivot to cause longitudinal movements of said shaft in one direction or the other.

4. In a machine of the character described, the combination of a longitudinally movable shaft, an arm pivotally supported at one end and extending across and beyond said shaft, a swiveled block carried by said arm and having connection with said shaft, the said arm being provided with a cross bar at its upper end, said bar extending transversely of and forming an obtuse angle with the said shaft and being provided with cam surfaces which extend longitudinally of said bar, a lever pivotally supported at one end and extending in the same direction as and in parallel relation to the said arm, said lever being provided with means for engaging the said cam surfaces whereby movement of the said lever upon its pivot effects in and out movements of the said arm to cause longitudinal movements of the said shaft.

5. In a machine of the character described, the combination of a longitudinally movable shaft, an arm pivoted at one end a distance to one side of one end of said shaft, said arm extending across and beyond the said shaft, a swiveled member carried by said arm through which a reduced end portion of the said shaft extends, a thrust bearing upon the said reduced end portion against which the said swiveled member is adapted to contact, cams carried upon said arm, a lever pivoted upon a pivot the axis of which extends at right angles to the pivot of said arm whereby the said arm and lever are movable in planes at right angles to each other, and the said arm being provided with means for engaging the said cams whereby movement of said lever upon its pivot causes movement of the said arm and the said shaft.

6. In a machine of the character described, the combination of a longitudinally movable shaft, an arm pivoted at one end and extending transversely of said shaft, said arm being provided with a swinging member having connection with the said shaft, and the said arm being provided at its outer swinging end with a cross bar which extends transversely of and at an obtuse angle with respect to the said shaft, said bar being provided with oppositely disposed parallel cam surfaces, a lever pivoted upon a pivot which extends at right angles to the pivot of the said arm, said pivot being provided with a projection having a notch therein the opposite edges of which engage the respective cam surfaces whereby movement of said lever upon its pivot effects pivotal movement of the said arm and consequent longitudinal movement of the said shaft.

7. In a machine of the character described, the combination of a longitudinally movable shaft, an arm pivoted at one end and extending transversely of and across the said shaft, said arm being provided with a swiveled member having connection with said shaft and also being provided with a cross bar upon its outer swinging end, said cross bar having a flange which extends transversely of and at an obtuse angle with respect to the said shaft, a lever pivoted at one end upon a pivot extending at right angles to the pivot of the said arm, said lever having a projection provided with a notch in one side thereof, the opposite sides of said notch being in engagement with the opposite sides of said flange whereby, upon back and forth pivotal movement of the said lever back and forth pivotal movement of the said arm is effected to cause longitudinal movements back and forth of the said shaft.

8. In a machine of the character described, the combination of a longitudinally movable shaft, an arm pivoted a distance to one side of said shaft and extending across and beyond the same, said arm having pivotal connection with said shaft and the said arm also having a horizontally arranged cross bar at its outer end, said bar being provided with horizontally extending cam surfaces, said surfaces occupying vertical planes which form obtuse angles with the axis of the said shaft, and a lever supported upon a pivot which pivot extends at right angles to the pivot of said arm, said lever being provided with a projection a distance from its pivot, which projection is provided with means for engaging the said cam surfaces whereby upon movement of the said lever back and forth upon its pivot back and forth movements of the said arm are effected to cause back and forth longitudinal movement of the said shaft.

In testimony that I claim the foregoing as my invention I have hereunto signed my name this 17th day of April, A. D., 1920.

MEYER AXILROD.